United States Patent
Chen

(10) Patent No.: US 12,177,702 B2
(45) Date of Patent: Dec. 24, 2024

(54) MEASUREMENT GAP PROCESSING METHOD, TERMINAL, AND NETWORK NODE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 229 days.

(21) Appl. No.: 17/127,619

(22) Filed: Dec. 18, 2020

(65) Prior Publication Data
US 2021/0105651 A1    Apr. 8, 2021

Related U.S. Application Data

(63) Continuation of application No. PCT/CN2019/091862, filed on Jun. 19, 2019.

(30) Foreign Application Priority Data

Jun. 20, 2018    (CN) .................. 201810639867.X

(51) Int. Cl.
| | |
|---|---|
| H04W 24/10 | (2009.01) |
| H04L 5/00 | (2006.01) |
| H04W 36/00 | (2009.01) |
| H04W 72/04 | (2023.01) |
| H04W 72/23 | (2023.01) |

(52) U.S. Cl.
CPC ........... *H04W 24/10* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2015/0327104 A1 | 11/2015 | Yiu et al. | |
| 2018/0084448 A1* | 3/2018 | Yang | ..................... H04W 16/32 |
| 2019/0090151 A1* | 3/2019 | Yiu | ......................... H04W 24/10 |
| 2019/0173634 A1* | 6/2019 | Teyeb | ............... H04W 72/0453 |

(Continued)

FOREIGN PATENT DOCUMENTS

| | | |
|---|---|---|
| CN | 106211230 A | 12/2016 |
| CN | 106792869 A | 5/2017 |

OTHER PUBLICATIONS

3GPP TSG-RAN WG2 NR #102 Meeting; R2-1809128; Busan, Korea (Year: 2018).*

(Continued)

*Primary Examiner* — Jeffrey M Rutkowski
*Assistant Examiner* — Ning Li
(74) *Attorney, Agent, or Firm* — Price Heneveld LLP

(57) ABSTRACT

A measurement gap processing method, a terminal, and a network node are provided. The method includes: obtaining a measurement gap configured by a first network node for the terminal and a measurement gap configured by a second network node for the terminal, where the measurement gaps configured by the first network node and the second network node for the terminal are different; and determining, based on the measurement gap configured by the first network node for the terminal and the measurement gap configured by the second network node for the terminal, a measurement gap for use by the terminal.

12 Claims, 3 Drawing Sheets

(56) References Cited

U.S. PATENT DOCUMENTS

| | | | | |
|---|---|---|---|---|
| 2019/0174343 A1* | 6/2019 | Cui | ................... | H04W 72/1268 |
| 2019/0253909 A1* | 8/2019 | Yiu | ................... | H04W 72/0453 |
| 2020/0128453 A1* | 4/2020 | Teyeb | ............... | H04W 36/0072 |
| 2020/0396704 A1* | 12/2020 | Dalsgaard | ............. | H04W 24/10 |
| 2021/0105646 A1* | 4/2021 | Siomina | ................ | H04W 24/08 |

OTHER PUBLICATIONS

"Clarification for measurement gap type", Nokia, Nokia Shanghai Bell, p3GPP TSG-RAN WG2 Meeting #102, R2-1808577, May 21, 2018.

"Summary of Offline discussion #43 [Gap Type decision]", ZTE Corporation, 3GPP TSG-RAN WH2 NR #102, R2-1809128, May 21, 2018.

Written Opinion and International Search Report in Application No. PCT/CN2019/091862 dated Dec. 30, 2020.

"3rd Generation Partnership Project; Technical Specification Group Radio Access Network; NR; Requirements for support of radio resource management (Release 15)", 3GPP TS 38.133 v15.2.0 (Jun. 2018).

EP Search Report in Application No. 19822858.7 dated Jul. 29, 2021.

"Measurement Gap Configuration in MR-DC" 3GPP TSG-RAN2 Meeting AH2, OPPO, R2-1706347, Jun. 27, 2017.

"Measurement Gap Configuration for EN-DC" 3GPP TSG-RAN WG2#bis Meeting, R2-1711299, Samsung, Oct. 9, 2017.

"Clarification for measurement gap type for UE in EN-DC" 3GPP TSG-RAN WG2 Meeting #102, Nokia, Nokia Shanghai Bell, R2-1808580, May 21, 2018.

* cited by examiner

MEASUREMENT GAP PROCESSING METHOD, TERMINAL, AND NETWORK NODE

CROSS-REFERENCE TO RELATED APPLICATIONS

This application is continuation application of PCT International Application No. PCT/CN2019/091862 filed on Jun. 19, 2019, which claims priority to Chinese Patent Application No. 201810639867.X, filed in China on Jun. 20, 2018, the disclosures of which are incorporated in their entireties by reference herein.

TECHNICAL FIELD

This disclosure relates to the field of communications technologies, and in particular, to a measurement gap processing method, a terminal, and a network node.

BACKGROUND

After a Fifth Generation (5G) system is introduced, a dual connectivity (Dual Connectivity, DC) architecture is used in some scenarios to improve transmission reliability. In phase-1 deployment, a dual connectivity architecture is used with long term evolution (LTE) to satisfy an interworking (interworking) requirement. In an LTE DC architecture, a measurement gap (measurement gap) is configured per UE, that is, one measurement gap is configured for each terminal UE, and configured by a master base station (MeNB, MN).

In new radio (5G NR) or LTE-NR dual connectivity (EN-DC) architecture, an SeNB or a secondary base station (SgNB, SN) may have more capabilities, including a measurement gap configuration capability. Currently, a measurement gap per frequency range (per-FR) has been consented. The SN may configure an FR2 measurement gap for the terminal. The MN may configure a per-UE measurement gap or an FR1 measurement gap for the terminal.

When the SN and the MN both configure measurement gaps for the terminal, the terminal cannot determine which measurement gap is to be used by the terminal.

SUMMARY

Embodiments of this disclosure provide a measurement gap processing method, a terminal, and a network node, to resolve a problem in the related art that when a plurality of network nodes configure different measurement gaps for a terminal, the terminal cannot determine which measurement gap is used for measurement.

To resolve the foregoing technical problem, this disclosure is implemented as follows: A measurement gap processing method applied to a terminal includes:
  obtaining a measurement gap configured by a first network node for the terminal and a measurement gap configured by a second network node for the terminal, where the measurement gaps configured by the first network node and the second network node for the terminal are different; and
  determining, based on the measurement gap configured by the first network node for the terminal and the measurement gap configured by the second network node for the terminal, a measurement gap for use by the terminal.

An embodiment of this disclosure further provides a measurement gap processing method, applied to a network node, where a terminal accesses the network node, and the method includes:
  configuring a measurement gap for the terminal; and
  receiving first indication information sent by the terminal, where the first indication information is used to indicate at least one of the following:
  a measurement gap for use by the terminal;
  the measurement gap for use by the terminal is the measurement gap configured by the first network node for the terminal;
  the measurement gap for use by the terminal is the measurement gap configured by the second network node for the terminal;
  the terminal ignores the measurement gap configured by the first network node for the terminal;
  the terminal ignores the measurement gap configured by the second network node for the terminal;
  the measurement gap configured by the first network node for the terminal; and
  the measurement gap configured by the second network node for the terminal.

An embodiment of this disclosure further provides a terminal, including:
  an obtaining module, configured to obtain a measurement gap configured by a first network node for the terminal and a measurement gap configured by a second network node for the terminal, where the measurement gaps configured by the first network node and the second network node for the terminal are different; and
  a determining module, configured to determine, based on the measurement gap configured by the first network node for the terminal and the measurement gap configured by the second network node for the terminal, a measurement gap for use by the terminal.

An embodiment of this disclosure further provides a terminal, including a processor, a memory, and a computer program stored in the memory and capable of running on the processor, where when the computer program is executed by the processor, steps of the foregoing measurement gap processing method are implemented.

An embodiment of this disclosure further provides a computer-readable storage medium, where the computer-readable storage medium stores a computer program, and when the computer program is executed by a processor, steps of the foregoing measurement gap processing method are implemented.

An embodiment of this disclosure further provides a network node, where a terminal accesses the network node, and the network node includes:
  a configuration module, configured to configure a measurement gap for the terminal; and
  a receiving module, configured to receive first indication information sent by the terminal, where the first indication information is used to indicate at least one of the following:
  a measurement gap for use by the terminal;
  the measurement gap for use by the terminal is the measurement gap configured by the first network node for the terminal;
  the measurement gap for use by the terminal is the measurement gap configured by the second network node for the terminal;
  the terminal ignores the measurement gap configured by the first network node for the terminal;

the terminal ignores the measurement gap configured by the second network node for the terminal;

the measurement gap configured by the first network node for the terminal; and the measurement gap configured by the second network node for the terminal.

An embodiment of this disclosure further provides a network node, including a processor, a memory, and a computer program stored in the memory and capable of running on the processor, where when the computer program is executed by the processor, steps of the foregoing measurement gap processing method are implemented.

An embodiment of this disclosure further provides a computer-readable storage medium, where the computer-readable storage medium stores a computer program, and when the computer program is executed by a processor, steps of the foregoing measurement gap processing method are implemented.

In the embodiments of this disclosure, when the first network node and the second network node configure different measurement gaps for the terminal, the terminal determines the measurement gap for use by the terminal. Therefore, a more accurate measurement gap is obtained.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

Figure 1:
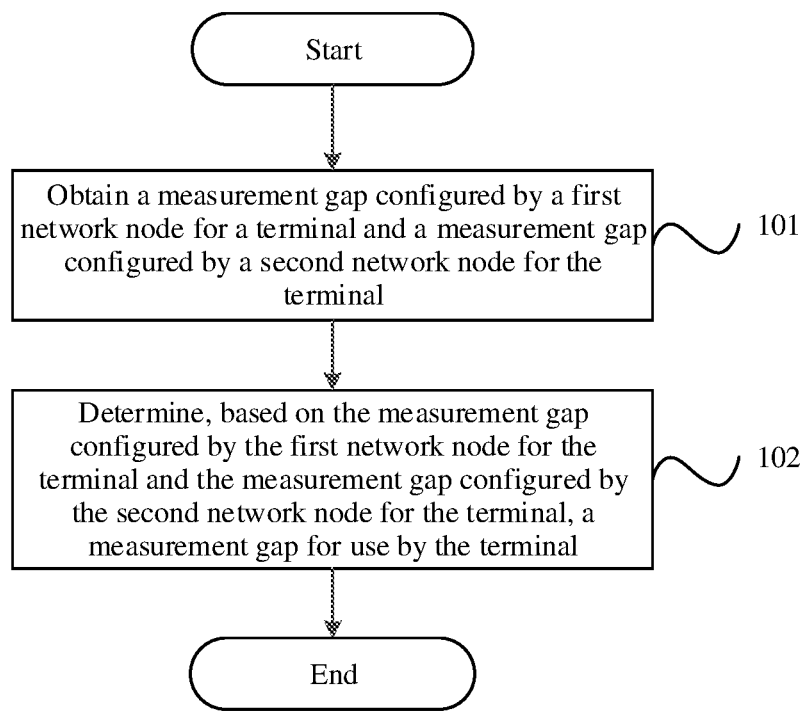
FIG. 1 presents a first flowchart of steps of a measurement gap processing method according to an embodiment of this disclosure.

As shown in FIG. 1, an embodiment of this disclosure provides a measurement gap processing method. The method is applied to a terminal and includes the following steps.

Step 101: Obtain a measurement gap configured by a first network node for the terminal and a measurement gap configured by a second network node for the terminal, where the measurement gaps configured by the first network node and the second network node for the terminal are different.

In this step, the first network node and the second network node may configure measurement gaps for the terminal simultaneously, or may configure measurement gaps for the terminal sequentially. Optionally, the different measurement gaps may be measurement gaps of different granularity, for example, per terminal granularity (per-UE), per frequency range granularity (per-FR), per carrier granularity (per-CC (component carrier)), per carrier group granularity (per-CG (carrier group)), per bandwidth part granularity (per-BWP (bandwidth part)), per bandwidth granularity (per-band), and per bandwidth combination granularity (per-band combination); or may be different measurement gap configurations of same granularity, for example, different start time positions, duration, periods, aperiodic indications, one-time indications, offsets, or patterns; or may be different measurement gap configurations of different granularity. This is not limited.

Step 102: Determine, based on the measurement gap configured by the first network node for the terminal and the measurement gap configured by the second network node for the terminal, a measurement gap for use by the terminal.

In this step, one or more measurement gaps may be used by the terminal. This is not specifically limited herein.

Optionally, in the foregoing embodiment of this disclosure, the first network node and the second network node are network nodes in a DC architecture or network nodes in a carrier aggregation (CA) architecture, and the terminal is a terminal in the dual connectivity architecture. Optionally, the first network node may be a master base station MN, and the second network node may be a secondary base station SN; or the first network node is a secondary base station SN, and the second network node is a master base station MN; or the first network node may be a node in a master cell group (MCG), and the second network node may be a node in a secondary cell group (SCG); or the first network node may be a node in an SCG, and the second network node may be a node in an MCG.

Further, in the foregoing embodiment of this disclosure, the measurement gap configured by the first network node for the terminal includes at least one of the following:

a measurement gap based on per-UE granularity, which may be referred to as a per-UE gap for short;

a measurement gap based on per-frequency range granularity, which may be referred to as a per-FR gap for short;

a measurement gap based on per-CC granularity, which may be referred to as a per-CC gap for short;

a measurement gap based on per-carrier group granularity, which may be referred to as a per-CG gap for short;

a measurement gap based on per-bandwidth part granularity, which may be referred to as a per-BWP gap for short;

a measurement gap based on per-bandwidth granularity, which may be referred to as a per-band gap for short; and a measurement gap based on per-bandwidth combination granularity, which may be referred to as a per-band combination gap for short; and the measurement gap configured by the second network node for the terminal includes at least one of the following:

a measurement gap based on per-UE granularity, which may be referred to as a per-UE gap for short;

a measurement gap based on per-frequency range granularity, which may be referred to as a per-FR gap for short;

a measurement gap based on per-CC granularity, which may be referred to as a per-CC gap for short;

a measurement gap based on per-carrier group granularity, which may be referred to as a per-CG gap for short;

a measurement gap based on per-bandwidth part granularity, which may be referred to as a per-BWP gap for short;

a measurement gap based on per-bandwidth granularity, which may be referred to as a per-band gap for short; and a measurement gap based on per-bandwidth combination granularity, which may be referred to as a per-band combination gap for short.

The measurement gap based on per-UE granularity specifically indicates that a measurement gap is configured for each terminal; and the measurement gap based on per-frequency range granularity specifically indicates that a measurement gap is configured for each frequency range. For example, frequency ranges available for the terminal include a first frequency range FR1 and a second frequency range FR2. In this case, a first measurement gap is configured for the first frequency range FR1, and/or a second measurement gap is configured for the second frequency range FR2. Optionally, the first frequency range FR1 may be a low frequency range, and the second frequency range FR2 is a high frequency range.

With reference to different types of measurement gaps, the following describes the measurement gap selected by the terminal, so that the measurement gap for use by the terminal is determined more accurately.

Case 1: The first network node and the second network node separately configure different measurement gaps for the terminal, for example, separately configuring measurement gaps for the terminal based on different granularity. For example, when or after the first network node configures the measurement gap based on per-UE granularity, the second network node configures the measurement gap based on per-frequency range granularity (for example, a measurement gap configured for an FR1 or a measurement gap configured for an FR2). For another example, when or after the second network node configures the measurement gap based on per-frequency range granularity (for example, a measurement gap configured for an FR1 or a measurement gap configured for an FR2), the first network node configures the measurement gap based on per-UE granularity.

For the case 1, an embodiment of this disclosure provides a manner of directly determining a measurement gap. To be specific, the step of determining a measurement gap for use by the terminal includes:

determining that the terminal uses the measurement gap configured by the first network node; or determining that the terminal uses the measurement gap configured by the second network node; or determining that the terminal uses the measurement gap based on per-UE granularity; or determining that the terminal uses the measurement gap based on per-CC granularity; or determining that the terminal uses the measurement gap based on per-carrier group granularity; or determining that the terminal uses the measurement gap based on per-bandwidth part granularity; or determining that the terminal uses the measurement gap based on per-bandwidth granularity; or determining that the terminal uses the measurement gap based on per-bandwidth combination granularity; or determining that the terminal uses the measurement gap based on per-frequency range granularity, for example, a measurement gap configured for a first frequency range and/or a measurement gap configured for a second frequency range; or determining that the terminal uses both the measurement gap based on per-UE granularity and the measurement gap based on per-frequency range granularity; or determining that the terminal uses an earlier configured measurement gap in different measurement gaps; or determining that the terminal uses a later configured measurement gap in different measurement gaps.

Optionally, the step of determining that the terminal uses both the measurement gap based on per-UE granularity and the measurement gap based on per-frequency range granularity includes:

determining that the terminal uses the measurement gap based on per-UE granularity for a first frequency range and uses the measurement gap based on per-frequency range granularity for a second frequency range; or determining that the terminal uses the measurement gap based on per-frequency range granularity for a first frequency range and uses the measurement gap based on per-UE granularity for a second frequency range.

For the case 1, an embodiment of this disclosure further provides a manner of indirectly determining a measurement gap. To be specific, the method further includes:

the terminal ignores the measurement gap configured by the second network node; or the terminal ignores the measurement gap configured by the first network node; or the terminal ignores the measurement gap based on per-UE granularity; or the terminal ignores the measurement gap based on per-frequency range granularity; or the terminal ignores the measurement gap based on per-CC granularity; or the terminal ignores the measurement gap based on per-carrier group granularity; or the terminal ignores the measurement gap based on per-bandwidth part granularity; or the terminal ignores the measurement gap based on per-bandwidth granularity; or the terminal ignores the measurement gap based on per-bandwidth combination granularity; or the terminal ignores the measurement gap based on per-UE granularity for a first frequency range; or the terminal ignores the measurement gap based on per-UE granularity for a second frequency range; or the terminal ignores a later configured measurement gap in different measurement gaps; or the terminal ignores an earlier configured measurement gap in different measurement gaps.

For the manner of indirectly determining a measurement gap, it should be noted that in the manner of indirectly determining a measurement gap, the terminal uses a measurement gap that is not ignored, for performing measurement. For example, if the terminal ignores a later configured measurement gap in different measurement gaps, the terminal uses an earlier configured measurement gap in different measurement gaps, for performing measurement. For another example, if the terminal ignores the measurement gap configured by the second network node, the terminal uses the measurement gap configured by the first network node. Details are not exhaustively described herein.

Further, in the foregoing embodiment of this disclosure, after step 11, the method further includes:
sending first indication information to the first network node, and/or sending second indication information to the second network node, where
the first indication information and the second indication information are respectively used to indicate at least one of the following:
the measurement gap for use by the terminal;
the measurement gap for use by the terminal is the measurement gap configured by the first network node for the terminal;
the measurement gap for use by the terminal is the measurement gap configured by the second network node for the terminal;
the terminal ignores the measurement gap configured by the first network node for the terminal;
the terminal ignores the measurement gap configured by the second network node for the terminal;
the measurement gap configured by the first network node for the terminal; and
the measurement gap configured by the second network node for the terminal.

When the first indication information is sent to the first network node, the first indication information further includes:
a frequency range to which a measurement gap based on per-frequency range granularity is applicable, or a frequency range to which a measurement gap based on per-UE granularity is applicable; or
when the second indication information is sent to the second network node, the second indication information further includes:
a frequency range to which a measurement gap based on per-frequency range granularity is applicable, or a frequency range to which a measurement gap based on per-UE granularity is applicable.

It should be noted that a better principle for sending the first indication information to the first network node and/or sending the second indication information to the second network node is: if the terminal uses a measurement gap configured by a network node, the terminal sends indication information to the network node.

It should be further noted that content included in the first indication information and the second indication information may be the same or may be different. When the content included in the first indication information and the second information is the same, the first indication information and the second indication information may be considered as a same piece of indication information, and the indication information is sent to the first network node and/or the second network node. When the content included in the first indication information and the second indication information is different, the terminal sends the indication information to the first network node and/or the second network node separately.

For example, after the terminal uses the per-FR gap, the terminal notifies the first network node and/or the second network node.

Alternatively, after the terminal uses the per-UE gap, the terminal notifies the first network node and/or the second network node.

Alternatively, after the terminal uses the per-FR and the per-UE gap, the terminal notifies the first network node and/or the second network node.

Alternatively, after the terminal uses the per-UE gap in the first frequency range FR1 and uses the per-FR gap in the second frequency range FR2, the terminal notifies the first network node and/or the second network node.

Alternatively, after the terminal uses the per-UE gap in the second frequency range FR2 and uses the per-FR gap in the first frequency range FR1, the terminal notifies the first network node and/or the second network node.

For the case 1, the following provides detailed descriptions by using two examples.

Example 1

When or after the first network node configures the measurement gap based on per-UE granularity, but the second network node configures the measurement gap for the second frequency range FR2, the method for determining a measurement gap for use by the terminal includes any one of the following:

Method 1: The terminal ignores the measurement gap configured by the second network node for the second frequency range FR2.

Method 2: The terminal uses, in the FR2, the measurement gap configured for the FR2. Further, the terminal may ignore the measurement gap based on per-UE granularity and configured by the first network node.

Method 3: The terminal uses, in the FR2, the measurement gap configured for the FR2, and uses, in the first frequency range FR1, the measurement gap based on per-UE granularity.

Method 4: The terminal uses the measurement gap based on per-UE granularity and configured by the first network node.

Further, following the foregoing example, the method further includes:
the second network node or the terminal notifies the first network node that the measurement gap for the FR2 is configured for the terminal, or that the terminal uses the measurement gap configured for the FR2; or
the first network node or the terminal notifies the second network node that the measurement gap based on per-UE granularity is configured for the terminal, or that the terminal uses the measurement gap based on per-UE granularity, or that the UE uses, in the FR1, the measurement gap based on per-UE granularity.

Example 2

When or after the second network node configures the measurement gap for the second frequency range FR2, but the first network node configures the measurement gap based on per-UE granularity, the method for determining a measurement gap for use by the terminal includes any one of the following:

Method 5: The terminal ignores the measurement gap configured by the second network node for the second frequency range FR2.

Method 6: The terminal uses, in the FR2, the measurement gap configured for the FR2. Further, the terminal may ignore the measurement gap based on per-UE granularity and configured by the first network node.

Method 7: The terminal uses, in the FR2, the measurement gap configured for the FR2, and uses, in the first frequency range FR1, the measurement gap based on per-UE granularity.

Method 8: The terminal uses the measurement gap based on per-UE granularity and configured by the first network node.

Further, following the foregoing example, the method further includes:

the second network node or the terminal notifies the first network node that the measurement gap for the FR2 is configured for the terminal, or that the terminal uses the measurement gap configured for the FR2; or the first network node or the terminal notifies the second network node that the measurement gap based on per-UE granularity is configured for the terminal, or that the terminal uses the measurement gap based on per-UE granularity, or that the UE uses, in the FR1, the measurement gap based on per-UE granularity.

Case 2: The first network node configures the measurement gap based on per-frequency range granularity for the terminal, and the second network node configures the measurement gap based on per-frequency range granularity for the terminal. For example, when or after the first network node configures the measurement gap based on per-frequency range granularity (for example, a measurement gap configured for an FR1 or a measurement gap configured for an FR2), the second network node configures the measurement gap based on per-frequency range granularity (for example, a measurement gap configured for an FR1 or a measurement gap configured for an FR2).

For the case 2, an embodiment of this disclosure also provides a manner of directly determining a measurement gap. To be specific, the determining a measurement gap for use by the terminal includes:

determining that the terminal uses the measurement gap configured by the first network node; or determining that the terminal uses the measurement gap configured by the second network node; or determining that the terminal uses a measurement gap configured for a first frequency range; or determining that the terminal uses a measurement gap configured for a second frequency range; or determining that the terminal uses a measurement gap configured for a first frequency range and uses a measurement gap configured for a second frequency range; or determining that the terminal uses, in a first frequency range, a measurement gap configured for the first frequency range; or determining that the terminal uses, in a second frequency range, a measurement gap configured for the second frequency range; or determining that the terminal uses, in a first frequency range, a measurement gap configured for the first frequency range, and uses, in a second frequency range, a measurement gap configured for the second frequency range; or determining that the terminal uses an earlier configured measurement gap in different measurement gaps; or determining that the terminal uses a later configured measurement gap in different measurement gaps.

For the case 2, an embodiment of this disclosure further provides a manner of indirectly determining a measurement gap. To be specific, the method further includes:

the terminal ignores the measurement gap configured by the second network node; or the terminal ignores the measurement gap configured by the first network node; or the terminal ignores a measurement gap configured for a first frequency range; or the terminal ignores a measurement gap configured for a second frequency range; or the terminal ignores, in a first frequency range, a measurement gap configured for a second frequency range; or the terminal ignores, in a second frequency range, a measurement gap configured for a first frequency range; or the terminal ignores a later configured measurement gap in different measurement gaps; or the terminal ignores an earlier configured measurement gap in different measurement gaps.

For the manner of indirectly determining a measurement gap, it should be noted that in the manner of indirectly determining a measurement gap, the terminal uses a measurement gap that is not ignored, for performing measurement. For example, if the terminal ignores a later configured measurement gap in different measurement gaps, the terminal uses an earlier configured measurement gap in different measurement gaps, for performing measurement. For another example, if the terminal ignores the measurement gap configured by the second network node, the terminal uses the measurement gap configured by the first network node. Details are not exhaustively described herein.

Further, in the foregoing embodiment of this disclosure, after step 11, the method further includes:

sending first indication information to the first network node, and/or sending second indication information to the second network node, where the first indication information and the second indication information are respectively used to indicate at least one of the following:

the measurement gap for use by the terminal;

the measurement gap for use by the terminal is the measurement gap configured by the first network node for the terminal;

the measurement gap for use by the terminal is the measurement gap configured by the second network node for the terminal;

the terminal ignores the measurement gap configured by the first network node for the terminal;

the terminal ignores the measurement gap configured by the second network node for the terminal;

the measurement gap configured by the first network node for the terminal; and the measurement gap configured by the second network node for the terminal.

When the first indication information is sent to the first network node, the first indication information further includes:

a frequency range to which a measurement gap based on per-frequency range granularity is applicable, or a frequency range to which a measurement gap based on per-UE granularity is applicable; or when the second indication information is sent to the second network node, the second indication information further includes:

a frequency range to which a measurement gap based on per-frequency range granularity is applicable, or a frequency range to which a measurement gap based on per-UE granularity is applicable.

It should be noted that a better principle for sending the first indication information to the first network node and/or sending the second indication information to the second network node is: if the terminal uses a measurement gap configured by a network node, the terminal sends indication information to the network node.

It should be further noted that content included in the first indication information and the second indication information may be the same or may be different. When the content included in the first indication information and the second information is the same, the first indication information and the second indication information may be considered as a same piece of indication information, and the indication information is sent to the first network node and/or the second network node. When the content included in the first indication information and the second indication information is different, the terminal sends the indication information to the first network node and/or the second network node separately.

For example, the terminal or the second network node notifies the first network node: (a) the terminal uses the measurement gap configured for the FR1 and/or the terminal uses the measurement gap configured for the FR2; (b) the terminal ignores the measurement gap configured for the FR1 or the terminal ignores the measurement gap configured for the FR2; or (c) the second network node configures the measurement gap for the FR1 or the measurement gap for the FR2 for the terminal.

For another example, the terminal or the first network node notifies the second network node: (d) the terminal uses the measurement gap configured for the FR1 and/or the terminal uses the measurement gap configured for the FR2; (e) the terminal ignores the measurement gap configured for the FR1 or the terminal ignores the measurement gap configured for the FR2; or (f) the first network node configures the measurement gap for the FR1 or the measurement gap for the FR2 for the terminal.

For the case 2, the following provides detailed descriptions by using an example.

Example 3

When or after the second network node configures the measurement gap for the FR2, but the first network node configures the measurement gap for the FR1, or when or after the first network node configures the measurement gap for the FR1, but the second network node configures the measurement gap for the FR2, the method for determining a measurement gap for use by the terminal includes any one of the following:

Method 9: The terminal ignores the measurement gap configured by the second network node for the FR2 or the terminal ignores the measurement gap configured by the first network node for the FR1.

Method 10: The terminal uses the measurement gap configured by the second network node for the FR2 and/or the terminal uses the measurement gap configured by the first network node for the FR1.

Method 11: The terminal uses, in the FR2, the measurement gap configured for the FR2, and applies, in the FR1, the measurement gap configured for the FR1.

Further, following the foregoing example, the method further includes:
the second network node or the terminal notifies the first network node that the measurement gap for the FR2 is configured for the terminal, or that the terminal uses the measurement gap for the FR2; or
the second network node or the terminal notifies the first network node that the measurement gap for the FR1 is configured for the terminal, or that the terminal uses the measurement gap for the FR1.

In conclusion, the foregoing embodiment of this disclosure defines which measurement gap is selected by the terminal to be effective. Therefore, a more accurate measurement gap is obtained, and measurement efficiency is improved.

Figure 2:
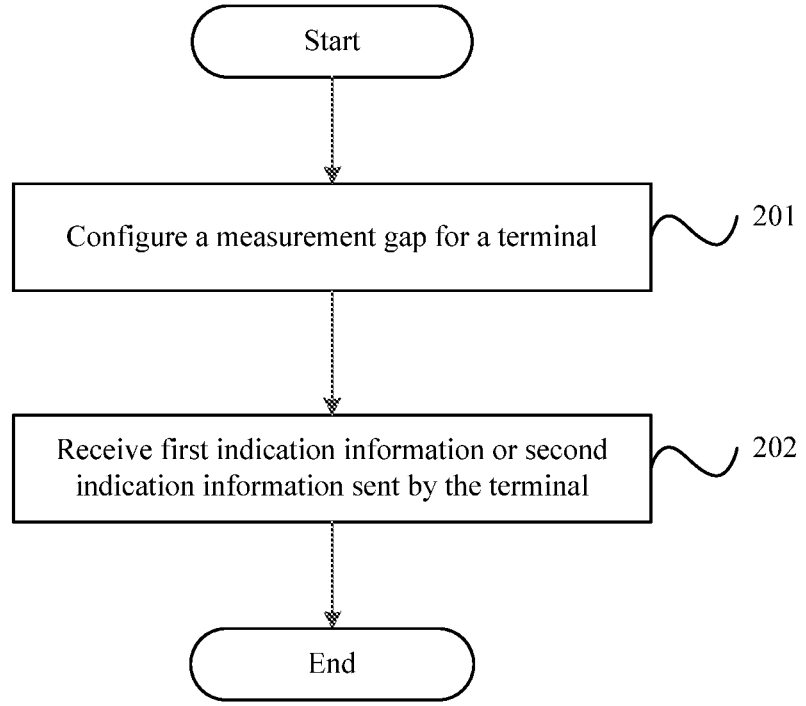
FIG. 2 presents a second flowchart of steps of a measurement gap processing method according to an embodiment of this disclosure.

As shown in FIG. 2, an embodiment of this disclosure further provides a measurement gap processing method. The method is applied to a first network node or a second network node and includes the following steps.

Step 201: Configure a measurement gap for a terminal.

Step 202: Receive first indication information or second indication information sent by the terminal, where the first indication information and the second indication information are respectively used to indicate at least one of the following:
a measurement gap for use by the terminal;
the measurement gap for use by the terminal is the measurement gap configured by the first network node for the terminal;
the measurement gap for use by the terminal is the measurement gap configured by the second network node for the terminal;
the terminal ignores the measurement gap configured by the first network node for the terminal;
the terminal ignores the measurement gap configured by the second network node for the terminal;
the measurement gap configured by the first network node for the terminal; and
the measurement gap configured by the second network node for the terminal.

When the network node is the first network node, the first indication information is received; or when the network node is the second network node, the second indication information is received. Content included in the first indication information and the second indication information may be the same or may be different. This is not specifically limited herein.

Optionally, when the first indication information sent by the terminal is received, the first indication information further includes: a frequency range to which a measurement gap based on per-frequency range granularity is applicable, or a frequency range to which a measurement gap based on per-UE granularity is applicable; or
when the second indication information sent by the terminal is received, the second indication information further includes: a frequency range to which a measurement gap based on per-frequency range granularity is applicable, or a frequency range to which a measurement gap based on per-UE granularity is applicable.

Further, in the foregoing embodiment of this disclosure, the method further includes:
sending third indication information, where the third indication information is used to indicate at least one of the following:
the measurement gap for use by the terminal;
the measurement gap for use by the terminal is the measurement gap configured by the network node (the first network node or the second network node); and
the measurement gap configured by the network node (the first network node or the second network node) for the terminal.

When the network node is the first network node, the third indication information is sent to the second network node; or when the network node is the second network node, the third indication information is sent to the first network node.

It should be noted that in the foregoing embodiment of this disclosure, each of the two network nodes in the dual connectivity architecture may learn, by using the third indication information, information about the measurement gap for use by the terminal or information about the measurement gap configured by the other network node, so that the two network nodes can conveniently perform coordinated management and scheduling on the terminal.

Figure 3:
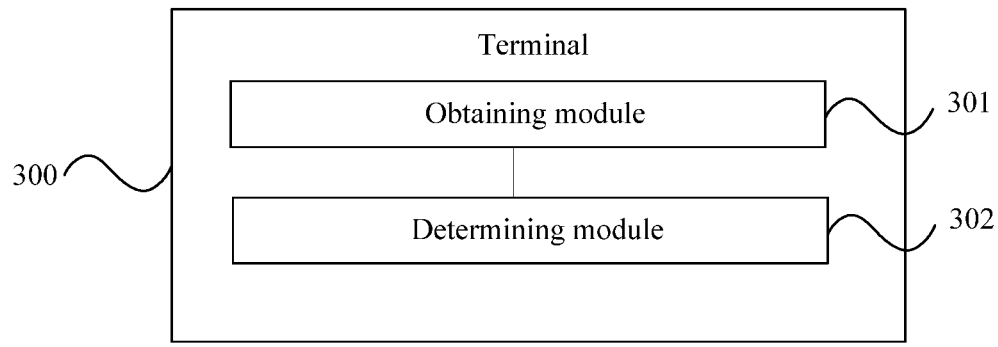
FIG. 3 presents a first schematic structural diagram of a terminal according to an embodiment of this disclosure.

As shown in FIG. 3, an embodiment of this disclosure further provides a terminal 300, including:

an obtaining module 301, configured to obtain a measurement gap configured by a first network node for the terminal and a measurement gap configured by a second network node for the terminal, where the measurement gaps configured by the first network node and the second network node for the terminal are different; and a determining module 302, configured to determine, based on the measurement gap configured by the first network node for the terminal and the measurement gap configured by the second network node for the terminal, a measurement gap for use by the terminal.

Optionally, in the foregoing embodiment of this disclosure, the measurement gap configured by the first network node for the terminal includes at least one of the following:

a measurement gap based on per-UE granularity;

a measurement gap based on per-frequency range granularity;

a measurement gap based on per-CC granularity;

a measurement gap based on per-carrier group granularity;

a measurement gap based on per-bandwidth part granularity;

a measurement gap based on per-bandwidth granularity; or a measurement gap based on per-bandwidth combination granularity; and the measurement gap configured by the second network node for the terminal includes at least one of the following:

a measurement gap based on per-UE granularity;

a measurement gap based on per-frequency range granularity;

a measurement gap based on per-CC granularity;

a measurement gap based on per-carrier group granularity;

a measurement gap based on per-bandwidth part granularity;

a measurement gap based on per-bandwidth granularity; or a measurement gap based on per-bandwidth combination granularity.

Optionally, in the foregoing embodiment of this disclosure, when the first network node and the second network node separately configure different measurement gaps for the terminal, the determining module 302 includes:

a first determining submodule, configured to determine that the terminal uses the measurement gap configured by the first network node; or configured to determine that the terminal uses the measurement gap configured by the second network node; or configured to determine that the terminal uses the measurement gap based on per-UE granularity; or configured to determine that the terminal uses the measurement gap based on per-frequency range granularity; or configured to determine that the terminal uses the measurement gap based on per-CC granularity; or configured to determine that the terminal uses the measurement gap based on per-carrier group granularity; or configured to determine that the terminal uses the measurement gap based on per-bandwidth part granularity; or configured to determine that the terminal uses the measurement gap based on per-bandwidth granularity; or configured to determine that the terminal uses the measurement gap based on per-bandwidth combination granularity; or configured to determine that the terminal uses both the measurement gap based on per-UE granularity and the measurement gap based on per-frequency range granularity; or configured to determine that the terminal uses an earlier configured measurement gap in different measurement gaps; or configured to determine that that the terminal uses a later configured measurement gap in different measurement gaps.

Optionally, in the foregoing embodiment of this disclosure, when the first determining submodule is configured to determine that the terminal uses both the measurement gap based on per-UE granularity and the measurement gap based on per-frequency range granularity, the first determining submodule is further configured to:

determine that the terminal uses the measurement gap based on per-UE granularity for a first frequency range and uses the measurement gap based on per-frequency range granularity for a second frequency range; or determine that the terminal uses the measurement gap based on per-frequency range granularity for a first frequency range and uses the measurement gap based on per-UE granularity for a second frequency range.

Optionally, in the foregoing embodiment of this disclosure, when the first network node and the second network node separately configure different measurement gaps for the terminal, the terminal further includes:

a first ignoring module, configured to ignore the measurement gap configured by the second network node; or configured to ignore the measurement gap configured by the first network node; or configured to ignore the measurement gap based on per-UE granularity; or configured to ignore the measurement gap based on per-frequency range granularity; or configured to ignore the measurement gap based on per-CC granularity; or configured to ignore the measurement gap based on per-carrier group granularity; or configured to ignore the measurement gap based on per-bandwidth part granularity; or configured to ignore the measurement gap based on per-bandwidth granularity; or configured to ignore the measurement gap based on per-bandwidth combination granularity; or configured to ignore the measurement gap based on per-UE granularity for a first frequency range; or configured to ignore the measurement gap based on per-UE granularity for a second frequency range; or configured to ignore a later configured measurement gap in different measurement gaps; or configured to ignore an earlier configured measurement gap in different measurement gaps.

Optionally, in the foregoing embodiment of this disclosure, when the first network node configures the measurement gap based on per-frequency range granularity for the terminal, and the second network node configures the measurement gap based on per-frequency range granularity for the terminal, the determining module 302 is configured to determine that the terminal uses the measurement gap configured by the first network node; or is configured to determine that the terminal uses the measurement gap configured by the second network node; or is configured to determine that the terminal uses a measurement gap configured for a first frequency range; or is configured to determine that the terminal uses a measurement gap configured for a second frequency range; or is configured to determine that the terminal uses a measurement gap configured for a first frequency range and uses a measurement gap configured for a second frequency range; or is configured to determine that the terminal uses, in a first frequency range, a measurement gap configured for the first frequency range; or is configured to determine that the terminal uses, in a second frequency range, a measurement gap configured for the second frequency range; or is configured to determine that the terminal uses, in a first frequency range, a measurement gap configured for the first frequency range, and uses, in a second frequency range, a measurement gap configured for the second frequency range; or is configured to determine that the terminal uses an earlier configured measurement gap in different measurement gaps; or is configured to determine that the terminal uses a later configured measurement gap in different measurement gaps.

Optionally, in the foregoing embodiment of this disclosure, when the first network node configures the measurement gap based on per-frequency range granularity for the terminal, and the second network node configures the measurement gap based on per-frequency range granularity for the terminal, the terminal further includes:

a second ignoring module, configured to ignore the measurement gap configured by the second network node; or configured to ignore the measurement gap configured by the first network node; or configured to ignore a measurement gap configured for a first frequency range; or configured to ignore a measurement gap configured for a second frequency range; or configured to ignore, in a first frequency range, a measurement gap configured for a second frequency range; or configured to ignore, in a second frequency range, a measurement gap configured for a first frequency range; or configured to ignore a later configured measurement gap in different measurement gaps; or configured to ignore an earlier configured measurement gap in different measurement gaps.

Optionally, in the foregoing embodiment of this disclosure, the terminal further includes:

a first sending module, configured to send first indication information to the first network node, and/or configured to send second indication information to the second network node, where the first indication information and the second indication information are respectively used to indicate at least one of the following:

the measurement gap for use by the terminal;

the measurement gap for use by the terminal is the measurement gap configured by the first network node for the terminal;

the measurement gap for use by the terminal is the measurement gap configured by the second network node for the terminal;

the terminal ignores the measurement gap configured by the first network node for the terminal;

the terminal ignores the measurement gap configured by the second network node for the terminal;

the measurement gap configured by the first network node for the terminal; and the measurement gap configured by the second network node for the terminal.

Optionally, in the foregoing embodiment of this disclosure, when the first indication information is sent to the first network node, the first indication information further includes:

a frequency range to which a measurement gap based on per-frequency range granularity is applicable, or a frequency range to which a measurement gap based on per-UE granularity is applicable; or when the second indication information is sent to the second network node, the second indication information further includes:

a frequency range to which a measurement gap based on per-frequency range granularity is applicable, or a frequency range to which a measurement gap based on per-UE granularity is applicable.

The terminal provided by this embodiment of this disclosure can implement each process implemented by the terminal in the method embodiment in FIG. 1. To avoid repetition, details are not described again herein.

In conclusion, this embodiment of this disclosure defines which measurement gap is selected by the terminal to be effective when the first network node and the second network node configure different measurement gaps for the terminal. Because the terminal determines the measurement gap for use by the terminal, a more accurate measurement gap is obtained, and measurement efficiency is improved.

It should be noted that the terminal provided by this embodiment of this disclosure is a terminal that can perform the foregoing measurement gap processing method. In this case, all embodiments of the foregoing measurement gap processing method are applicable to the terminal, and can achieve a same or similar beneficial effect.

Figure 4:
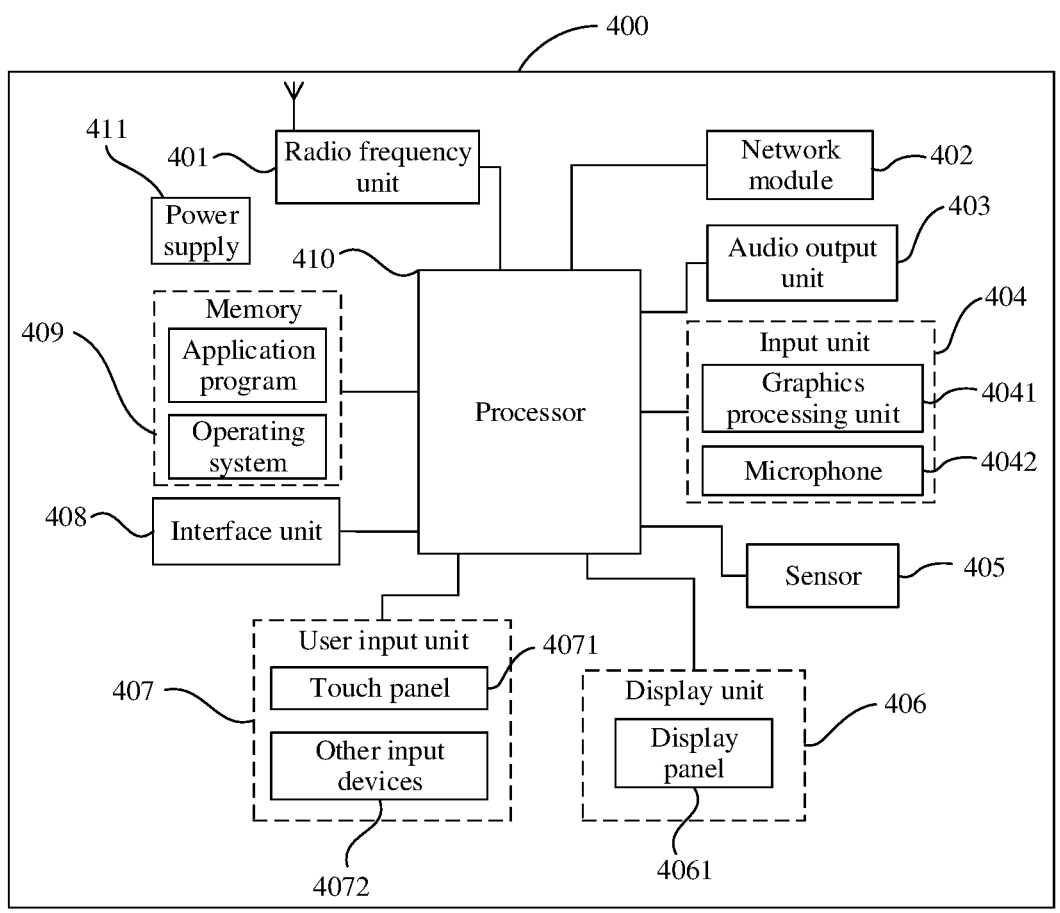
FIG. 4 presents a second schematic structural diagram of a terminal according to an embodiment of this disclosure.

FIG. 4 is a schematic diagram of a hardware structure of a terminal for implementing each embodiment of this disclosure. The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the terminal shown in FIG. 4 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 401 is configured to obtain a measurement gap configured by a first network node for the terminal and a measurement gap configured by a second network node for the terminal, where the measurement gaps configured by the first network node and the second network node for the terminal are different.

The processor 410 is configured to determine, based on the measurement gap configured by the first network node for the terminal and the measurement gap configured by the second network node for the terminal, a measurement gap for use by the terminal.

This embodiment of this disclosure defines which measurement gap is selected by the terminal to be effective when the first network node and the second network node configure different measurement gaps for the terminal. Because the terminal determines the measurement gap for use by the terminal, a more accurate measurement gap is obtained, and measurement efficiency is improved.

It should be understood that in this embodiment of this disclosure, the radio frequency unit 401 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and other devices through a wireless communications system.

The terminal provides wireless broadband internet access for a user by using the network module 402, for example, helping the user send and receive e-mails, browse web pages, and access streaming media.

The audio output unit 403 may convert audio data received by the radio frequency unit 401 or the network module 402 or stored in the memory 409 into an audio signal, and output the audio signal as a sound. In addition, the audio output unit 403 may further provide an audio output (for example, a call signal received sound or a message received sound) related to a specific function performed by the terminal 400. The audio output unit 403 includes a speaker, a buzzer, a telephone receiver, and the like.

The input unit 404 is configured to receive an audio or video signal. The input unit 404 may include a graphics processing unit (GPU) 4041 and a microphone 4042. The graphics processing unit 4041 processes image data of a still picture or a video obtained by an image capture apparatus (for example, a camera) in an image capture mode or a video capture mode. A processed image frame may be displayed on the display unit 406. An image frame processed by the graphics processing unit 4041 may be stored in the memory 409 (or another storage medium) or sent by the radio frequency unit 401 or the network module 402. The microphone 4042 can receive a sound and can process the sound into audio data. The processed audio data may be converted in a telephone call mode into a format that can be sent by the radio frequency unit 401 to a mobile communications base station, for outputting.

The terminal 400 further includes at least one sensor 405, for example, an optical sensor, a motion sensor, and other sensors. Specifically, the optical sensor includes an ambient light sensor and a proximity sensor. The ambient light sensor may adjust luminance of a display panel 4061 based on brightness of ambient light. The proximity sensor may turn off and/or backlight the display panel 4061 when the terminal 400 moves to an ear. As a type of motion sensor, an accelerometer sensor may detect acceleration magnitudes in all directions (generally three axes), and when the accelerometer sensor is stationary, may detect a magnitude and a direction of gravity, and may be configured for terminal posture recognition (such as switching between landscape and portrait, related games, and magnetometer posture calibration), vibration recognition related functions (such as a pedometer and stroke), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided for the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information, and generate a key signal input related to user setting and function control of the terminal. Specifically, the user input unit 407 includes a touch panel 4071 and other input devices 4072. The touch panel 4071, also referred to as a touchscreen, may capture a touch operation performed by the user on or near the touch panel (for example, an operation performed by the user on the touch panel 4071 or near the touch panel 4071 by using any appropriate object or accessory such as a finger or a stylus). The touch panel 4071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 4071 may be implemented in a plurality of forms, for example, a resistive, capacitive, infrared, or surface acoustic wave touch panel. The user input unit 407 may further include the other input devices 4072 in addition to the touch panel 4071. Specifically, the other input devices 4072 may include but are not limited to a physical keyboard, a function key (such as a volume control key or a power on/off key), a trackball, a mouse, a joystick, and the like. Details are not described herein.

Further, the touch panel 4071 may cover the display panel 4061. After the touch panel 4071 detects a touch operation on or near the touch panel, the touch panel 4071 transmits the touch operation to the processor 410 to determine a type of a touch event. Then the processor 410 provides a corresponding visual output on the display panel 4061 based on the type of the touch event. Although the touch panel 4071 and the display panel 4061 are used as two independent components to implement input and output functions of the terminal in FIG. 4, the touch panel 4071 and the display panel 4061 may be integrated to implement the input and output functions of the terminal in some embodiments. This is not specifically limited herein.

The interface unit 408 is an interface for connecting an external apparatus to the terminal 400. For example, the external apparatus may include a wired or wireless headphone port, an external power (or battery charger) port, a wired or wireless data port, a memory card port, a port for connecting an apparatus provided with an identification module, an audio input/output (I/O) port, a video I/O port, an earphone port, and the like. The interface unit 408 may be configured to receive an input (for example, data information or power) from an external apparatus, and transmit the received input to one or more components in the terminal 400, or may be configured to transmit data between the terminal 400 and an external apparatus.

The memory 409 may be configured to store a software program and various data. The memory 409 may mainly include a program storage area and a data storage area. The program storage area may store an operating system, an application program required for at least one function (such as a sound play function and an image play function), and the like. The data storage area may store data created based on use of the terminal (such as audio data and a phone book), and the like. In addition, the memory 409 may include a high-speed random access memory, or may include a non-volatile memory, for example, at least one magnetic disk storage device, a flash memory, or other non-volatile solid-state storage devices.

The processor 410 is a control center of the terminal. The processor 410 uses various interfaces and lines to connect all parts of the entire terminal, and performs various functions and data processing of the terminal by running or executing the software program and/or module stored in the memory 409 and invoking data stored in the memory 409, thereby performing overall monitoring on the terminal. The processor 410 may include one or more processing units. Optionally, the processor 410 may integrate an application processor and a modem processor. The application processor mainly processes the operating system, a user interface, an application program, and the like. The modem processor mainly processes wireless communication. It may be understood that the modem processor may alternatively not be integrated into the processor 410.

The terminal 400 may further include the power supply 411 (such as a battery) supplying power to each component. Optionally, the power supply 411 may be logically connected to the processor 410 by using a power management system, so that functions such as charge and discharge management and power consumption management are implemented by using the power management system.

In addition, the terminal 400 includes some functional modules that are not illustrated. Details are not described herein.

Figure 5:
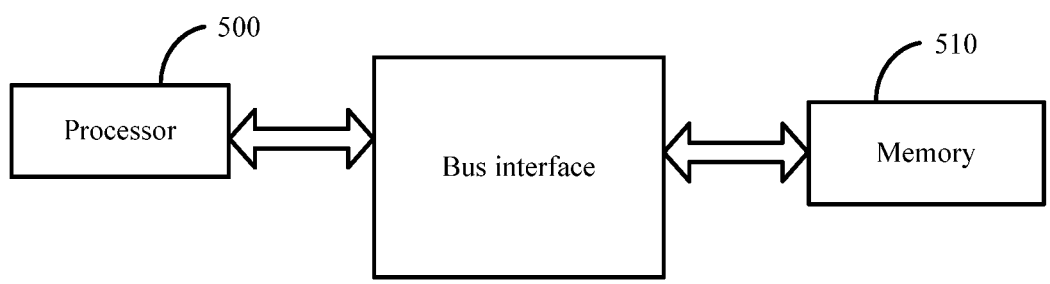
FIG. 5 presents a third schematic structural diagram of a terminal according to an embodiment of this disclosure.

Optionally, as shown in FIG. 5, an embodiment of this disclosure further provides a terminal, including: a processor 500, a memory 510, and a computer program stored in the memory 510 and capable of running on the processor 500. When the computer program is executed by the processor 500, each process of the foregoing embodiment of the measurement gap processing method is implemented, with a same technical effect achieved. To avoid repetition, details are not described again herein.

An embodiment of this disclosure further provides a computer-readable storage medium, where the computer-readable storage medium stores a computer program. When the computer program is executed by a processor, each process of the foregoing embodiment of the measurement gap processing method is implemented, with a same technical effect achieved. To avoid repetition, details are not described again herein. The computer-readable storage medium is, for example, a read-only memory (ROM), a random access memory (RAM), a magnetic disk, or an optical disc.

Figure 6:
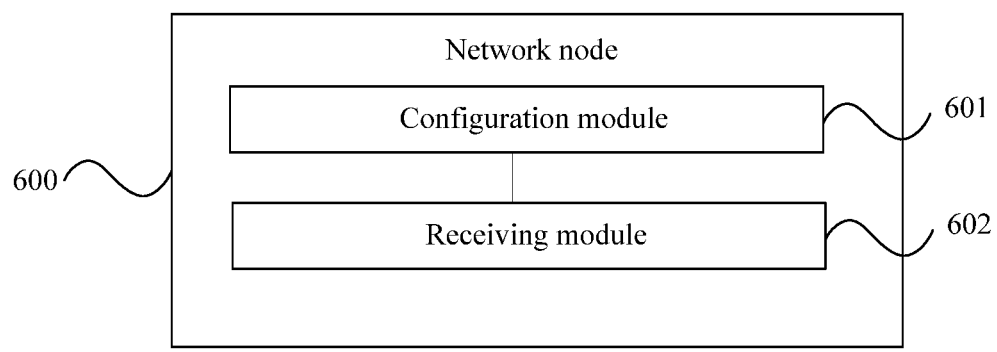
FIG. 6 presents a schematic structural diagram of a network node according to an embodiment of this disclosure.

As shown in FIG. 6, an embodiment of this disclosure further provides a network node 600, where the network node is a first network node or a second network node and includes:

a configuration module 601, configured to configure a measurement gap for a terminal; and a receiving module 602, configured to receive first indication information or second indication information sent by the terminal, where the first indication information and the second indication information are respectively used to indicate at least one of the following:

a measurement gap for use by the terminal;

the measurement gap for use by the terminal is the measurement gap configured by the first network node for the terminal;

the measurement gap for use by the terminal is the measurement gap configured by the second network node for the terminal;

the terminal ignores the measurement gap configured by the first network node for the terminal;

the terminal ignores the measurement gap configured by the second network node for the terminal;

the measurement gap configured by the first network node for the terminal; and the measurement gap configured by the second network node for the terminal.

Optionally, in the foregoing embodiment of this disclosure, when the first indication information sent by the terminal is received, the first indication information further includes: a frequency range to which a measurement gap based on per-frequency range granularity is applicable, or a frequency range to which a measurement gap based on per-UE granularity is applicable; or when the second indication information sent by the terminal is received, the second indication information further includes: a frequency range to which a measurement gap based on per-frequency range granularity is applicable, or a frequency range to which a measurement gap based on per-UE granularity is applicable.

Optionally, in the foregoing embodiment of this disclosure, the network node further includes:

a second sending module, configured to send third indication information, where the third indication information is used to indicate at least one of the following:

the measurement gap for use by the terminal;

the measurement gap for use by the terminal is the measurement gap configured by the network node; and the measurement gap configured by the network node for the terminal.

In conclusion, in the foregoing embodiment of this disclosure, each of the two network nodes in the dual connectivity architecture may learn, by using the third indication information, information about the measurement gap for use by the terminal or information about the measurement gap configured by the other network node, so that the two network nodes can conveniently perform coordinated management and scheduling on the terminal.

It should be noted that the network node provided by the foregoing embodiment of this disclosure is a network node that can perform the foregoing measurement gap processing method. In this case, all embodiments of the foregoing measurement gap processing method are applicable to the network node, and can achieve a same or similar beneficial effect.

Optionally, an embodiment of this disclosure further provides a terminal, including a processor, a memory, and a computer program stored in the memory and capable of running on the processor. When the computer program is executed by the processor, each process of the foregoing embodiment of the measurement gap processing method is implemented, with a same technical effect achieved. To avoid repetition, details are not described again herein.

An embodiment of this disclosure further provides a computer-readable storage medium, where the computer-readable storage medium stores a computer program. When the computer program is executed by a processor, each process of the foregoing embodiment of the measurement gap processing method is implemented, with a same technical effect achieved. To avoid repetition, details are not described again herein. The computer-readable storage medium is, for example, a read-only memory (ROM), a random access memory (RAM), a magnetic disk, or an optical disc.

It should be noted that in this specification, the term "comprise", "include", or any of their variants is intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A measurement gap processing method, applied to a terminal and comprising:
   obtaining a measurement gap configured by a first network node for the terminal and a measurement gap configured by a second network node for the terminal, wherein the measurement gaps configured by the first network node and the second network node for the terminal are different; and
   determining, based on the measurement gap configured by the first network node for the terminal and the measurement gap configured by the second network node for the terminal, one or more measurement gaps for use by the terminal; wherein one of the measurement gap configured by the first network node for the terminal and the measurement gap configured by the second network node for the terminal is a measurement gap based on per-UE granularity, and the other one of the measurement gap configured by the first network node for the terminal and the measurement gap configured by the second network node for the terminal is a measurement gap based on per-frequency range granularity;
   wherein in the case of determining that the terminal uses both the measurement gap based on per-UE granularity and the measurement gap based on per-frequency range granularity, the determining that the terminal uses both the measurement gap based on per-UE granularity and the measurement gap based on per-frequency range granularity comprises:
   determining that the terminal uses the measurement gap based on per-UE granularity for a first frequency range and uses the measurement gap based on per-frequency range granularity for a second frequency range; or
   determining that the terminal uses the measurement gap based on per-frequency range granularity for a first frequency range and uses the measurement gap based on per-UE granularity for a second frequency range.

2. The method according to claim 1, wherein the measurement gap configured by the first network node for the terminal comprises at least one of the following:
   a measurement gap based on per-UE granularity;
   a measurement gap based on per-frequency range granularity;
   a measurement gap based on per-component carrier (CC) granularity;
   a measurement gap based on per-carrier group granularity;
   a measurement gap based on per-bandwidth part granularity;
   a measurement gap based on per-bandwidth granularity; or
   a measurement gap based on per-bandwidth combination granularity; and
   the measurement gap configured by the second network node for the terminal comprises at least one of the following:
   a measurement gap based on per-UE granularity;
   a measurement gap based on per-frequency range granularity;
   a measurement gap based on per-CC granularity;
   a measurement gap based on per-carrier group granularity;
   a measurement gap based on per-bandwidth part granularity;
   a measurement gap based on per-bandwidth granularity; or
   a measurement gap based on per-bandwidth combination granularity.

3. The method according to claim 2, wherein the first network node and the second network node separately configure different measurement gaps for the terminal,
   wherein in the case of determining that the terminal uses one measurement gap, the method further comprises:
   determining that the terminal uses the measurement gap configured by the first network node; or
   determining that the terminal uses the measurement gap configured by the second network node; or
   determining that the terminal uses the measurement gap based on per-UE granularity; or
   determining that the terminal uses the measurement gap based on per-frequency range granularity; or
   determining that the terminal uses the measurement gap based on per-CC granularity; or
   determining that the terminal uses the measurement gap based on per-carrier group granularity; or
   determining that the terminal uses the measurement gap based on per-bandwidth part granularity; or
   determining that the terminal uses the measurement gap based on per-bandwidth granularity; or determining that the terminal uses the measurement gap based on per-bandwidth combination granularity; or
determining that the terminal uses an earlier configured measurement gap in different measurement gaps; or
determining that the terminal uses a later configured measurement gap in different measurement gaps.

4. The method according to claim 2, wherein the first network node and the second network node separately configure different measurement gaps for the terminal,
wherein in the case of determining that the terminal uses one measurement gap, the method further comprises:
ignoring, by the terminal, the measurement gap configured by the second network node; or
ignoring, by the terminal, the measurement gap configured by the first network node; or
ignoring, by the terminal, the measurement gap based on per-UE granularity; or
ignoring, by the terminal, the measurement gap based on per-frequency range granularity; or
ignoring, by the terminal, the measurement gap based on per-CC granularity; or
ignoring, by the terminal, the measurement gap based on per-carrier group granularity; or
ignoring, by the terminal, the measurement gap based on per-bandwidth part granularity; or
ignoring, by the terminal, the measurement gap based on per-bandwidth granularity; or
ignoring, by the terminal, the measurement gap based on per-bandwidth combination granularity; or
ignoring, by the terminal, the measurement gap based on per-UE granularity for a first frequency range; or
ignoring, by the terminal, the measurement gap based on per-UE granularity for a second frequency range; or
ignoring, by the terminal, a later configured measurement gap in different measurement gaps; or
ignoring, by the terminal, an earlier configured measurement gap in different measurement gaps.

5. The method according to claim 1, wherein the method further comprises:
sending first indication information to the first network node, and/or sending second indication information to the second network node,
wherein in the case of determining that the terminal uses one measurement gap, the first indication information and the second indication information are respectively used to indicate at least one of the following:
the measurement gap for use by the terminal;
the measurement gap for use by the terminal is the measurement gap configured by the first network node for the terminal;
the measurement gap for use by the terminal is the measurement gap configured by the second network node for the terminal;
the terminal ignores the measurement gap configured by the first network node for the terminal;
the terminal ignores the measurement gap configured by the second network node for the terminal;
the measurement gap configured by the first network node for the terminal; and
the measurement gap configured by the second network node for the terminal.

6. The method according to claim 5, wherein when the first indication information is sent to the first network node, the first indication information further comprises:
a frequency range to which a measurement gap based on per-frequency range granularity is applicable, or a frequency range to which a measurement gap based on per-UE granularity is applicable; or
when the second indication information is sent to the second network node, the second indication information further comprises:
a frequency range to which a measurement gap based on per-frequency range granularity is applicable, or a frequency range to which a measurement gap based on per-UE granularity is applicable.

7. A non-transitory computer-readable storage medium, wherein the non-transitory computer-readable storage medium stores a computer program, and when the computer program is executed by a processor, steps of the measurement gap processing method according to claim 1 are implemented.

8. A terminal, comprising a processor, a memory, and a computer program stored in the memory and capable of running on the processor, wherein when the computer program is executed by the processor, the processor is configured to perform:
obtaining a measurement gap configured by a first network node for the terminal and a measurement gap configured by a second network node for the terminal, wherein the measurement gaps configured by the first network node and the second network node for the terminal are different; and
determining, based on the measurement gap configured by the first network node for the terminal and the measurement gap configured by the second network node for the terminal, one or more measurement gaps for use by the terminal; wherein one of the measurement gap configured by the first network node for the terminal and the measurement gap configured by the second network node for the terminal is a measurement gap based on per-UE granularity, and the other one of the measurement gap configured by the first network node for the terminal and the measurement gap configured by the second network node for the terminal is a measurement gap based on per-frequency range granularity;
wherein in the case of determining that the terminal uses both the measurement gap based on per-UE granularity and the measurement gap based on per-frequency range granularity, the processor is further configured to perform:
determining that the terminal uses the measurement gap based on per-UE granularity for a first frequency range and uses the measurement gap based on per-frequency range granularity for a second frequency range; or
determining that the terminal uses the measurement gap based on per-frequency range granularity for a first frequency range and uses the measurement gap based on per-UE granularity for a second frequency range.

9. The terminal according to claim 8, wherein the measurement gap configured by the first network node for the terminal comprises at least one of the following:
a measurement gap based on per-UE granularity;
a measurement gap based on per-frequency range granularity;
a measurement gap based on per-component carrier (CC) granularity;
a measurement gap based on per-carrier group granularity;
a measurement gap based on per-bandwidth part granularity;
a measurement gap based on per-bandwidth granularity; or a measurement gap based on per-bandwidth combination granularity; and the measurement gap configured by the second network node for the terminal comprises at least one of the following:
a measurement gap based on per-UE granularity;
a measurement gap based on per-frequency range granularity;
a measurement gap based on per-CC granularity;
a measurement gap based on per-carrier group granularity;
a measurement gap based on per-bandwidth part granularity;
a measurement gap based on per-bandwidth granularity; or
a measurement gap based on per-bandwidth combination granularity.

10. The terminal according to claim 9, wherein the first network node and the second network node separately configure different measurement gaps for the terminal,
wherein in the case of determining that the terminal uses one measurement gap, the processor is further configured to perform:
determining that the terminal uses the measurement gap configured by the first network node; or
determining that the terminal uses the measurement gap configured by the second network node; or
determining that the terminal uses the measurement gap based on per-UE granularity; or
determining that the terminal uses the measurement gap based on per-frequency range granularity; or
determining that the terminal uses the measurement gap based on per-CC granularity; or
determining that the terminal uses the measurement gap based on per-carrier group granularity; or
determining that the terminal uses the measurement gap based on per-bandwidth part granularity; or
determining that the terminal uses the measurement gap based on per-bandwidth granularity; or
determining that the terminal uses the measurement gap based on per-bandwidth combination granularity; or
determining that the terminal uses an earlier configured measurement gap in different measurement gaps; or
determining that the terminal uses a later configured measurement gap in different measurement gaps.

11. The terminal according to claim 9, wherein the first network node and the second network node separately configure different measurement gaps for the terminal,
wherein in the case of determining that the terminal uses one measurement gap, the processor is configured to perform:

ignoring the measurement gap configured by the second network node; or
ignoring the measurement gap configured by the first network node; or
ignoring the measurement gap based on per-UE granularity; or
ignoring the measurement gap based on per-frequency range granularity; or
ignoring the measurement gap based on per-CC granularity; or
ignoring the measurement gap based on per-carrier group granularity; or
ignoring the measurement gap based on per-bandwidth part granularity; or
ignoring the measurement gap based on per-bandwidth granularity; or
ignoring the measurement gap based on per-bandwidth combination granularity; or
ignoring the measurement gap based on per-UE granularity for a first frequency range; or
ignoring the measurement gap based on per-UE granularity for a second frequency range; or
ignoring a later configured measurement gap in different measurement gaps; or
ignoring an earlier configured measurement gap in different measurement gaps.

12. The terminal according to claim 8, wherein the method further comprises:
sending first indication information to the first network node, and/or sending second indication information to the second network node, wherein
wherein in the case of determining that the terminal uses one measurement gap, the first indication information and the second indication information are respectively used to indicate at least one of the following:
the measurement gap for use by the terminal;
the measurement gap for use by the terminal is the measurement gap configured by the first network node for the terminal;
the measurement gap for use by the terminal is the measurement gap configured by the second network node for the terminal;
the terminal ignores the measurement gap configured by the first network node for the terminal;
the terminal ignores the measurement gap configured by the second network node for the terminal;
the measurement gap configured by the first network node for the terminal; and
the measurement gap configured by the second network node for the terminal.

* * * * *